United States Patent
De Castro Turner et al.

(10) Patent No.: US 11,897,336 B2
(45) Date of Patent: Feb. 13, 2024

(54) VEHICLE BODYWORK DISPLAY SCREEN

(71) Applicant: Seamless Digital Limited, Northamptonshire (GB)

(72) Inventors: Robert Rodrigues De Castro Turner, Northamptonshire (GB); Mark Antony Castro Turner, Northamptonshire (GB)

(73) Assignee: Seamless Digital Limited, Northamptonshire (GB)

( * ) Notice: Subject to any disclaimer, the term of this patent is extended or adjusted under 35 U.S.C. 154(b) by 622 days.

(21) Appl. No.: 17/255,767

(22) PCT Filed: Jun. 28, 2019

(86) PCT No.: PCT/GB2019/000091
§ 371 (c)(1),
(2) Date: Dec. 23, 2020

(87) PCT Pub. No.: WO2020/002866
PCT Pub. Date: Jan. 2, 2020

(65) Prior Publication Data
US 2021/0114462 A1    Apr. 22, 2021

(30) Foreign Application Priority Data

Jun. 29, 2018 (GB) ...................................... 1810799
Oct. 19, 2018 (GB) ...................................... 1817103

(51) Int. Cl.
*B60K 35/00* (2006.01)
*G09F 21/04* (2006.01)

(52) U.S. Cl.
CPC ............ *B60K 35/00* (2013.01); *G09F 21/048* (2013.01); *B60K 2370/1533* (2019.05);
(Continued)

(58) Field of Classification Search
None
See application file for complete search history.

(56) References Cited

U.S. PATENT DOCUMENTS 9,873,037 B2    1/2018 Hamilton
11,094,235 B2 *  8/2021 De Castro Turner ......................
G09F 21/048
(Continued)

FOREIGN PATENT DOCUMENTS

CN          203093951 U      7/2013
DE       102005034771 A1     5/2006
(Continued)

OTHER PUBLICATIONS

International Search Report in PCT Application No. PCT/GB2019/000091, dated Apr. 29, 2020.

*Primary Examiner* — Jennifer D. Carruth
(74) *Attorney, Agent, or Firm* — Cognition IP, P.C.; Edward Steakley

(57) ABSTRACT

A bodywork panel (13,28) for a vehicle such as a racing car (1,2) or a racing motor cycle (27) is fitted with one or more optically clear panels (16), which are profiled to follow the aerodynamic form of the bodywork panel (13,28). A flexible reflective display screen (17), for examples based on e-paper, is mounted to an inner face of each optically clear panel (16) such that an image on the display screen (17) is visible outside the vehicle through the optically clear panel (16). A paint finish on the bodywork panel (13,28) continues over a peripheral region of each optically clear panel (16), concealing a join between it and the bodywork panel (13,28). Images displayed on the display screens (17) via a display controller (25) can thus appear like painted graphics on the bodywork panel (13,28), except that they may be changed as desired. Thus, graphics on the vehicle, such as advertising and sponsorship logos, can be changed at will during a race. Leathers (30,40) worn by racing motor cyclists can be fitted with similar display screens (17) mounted behind optically clear flexible plastic panels (42) sewn to the leathers (30,40).

19 Claims, 12 Drawing Sheets

(52) U.S. Cl.
CPC .... *B60K 2370/52* (2019.05); *B60K 2370/589* (2019.05); *B60K 2370/797* (2019.05); *B60K 2370/816* (2019.05)

(56) References Cited

U.S. PATENT DOCUMENTS

| | | |
|---|---|---|
| 2007/0019424 A1 | 1/2007 | Alexander |
| 2012/0137399 A1 | 6/2012 | Forte et al. |
| 2016/0041581 A1 | 2/2016 | Piccionelli et al. |
| 2016/0295715 A1* | 10/2016 | Cho ........................ B32B 3/263 |

FOREIGN PATENT DOCUMENTS

| | | |
|---|---|---|
| DE | 102010034062 A1 | 2/2012 |
| DE | 20 2013 103405 U1 | 11/2014 |
| KR | 20150122042 A | 10/2015 |
| WO | 2005/020731 A1 | 3/2005 |
| WO | 2017/180900 A1 | 10/2017 |

* cited by examiner

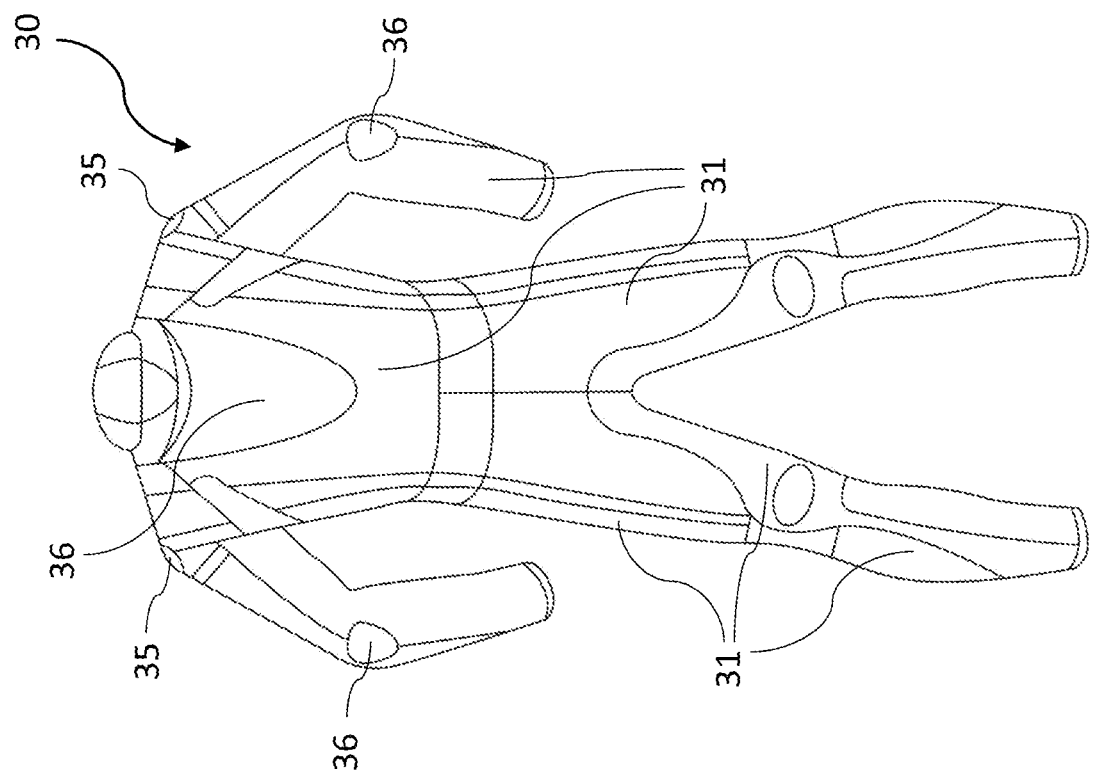
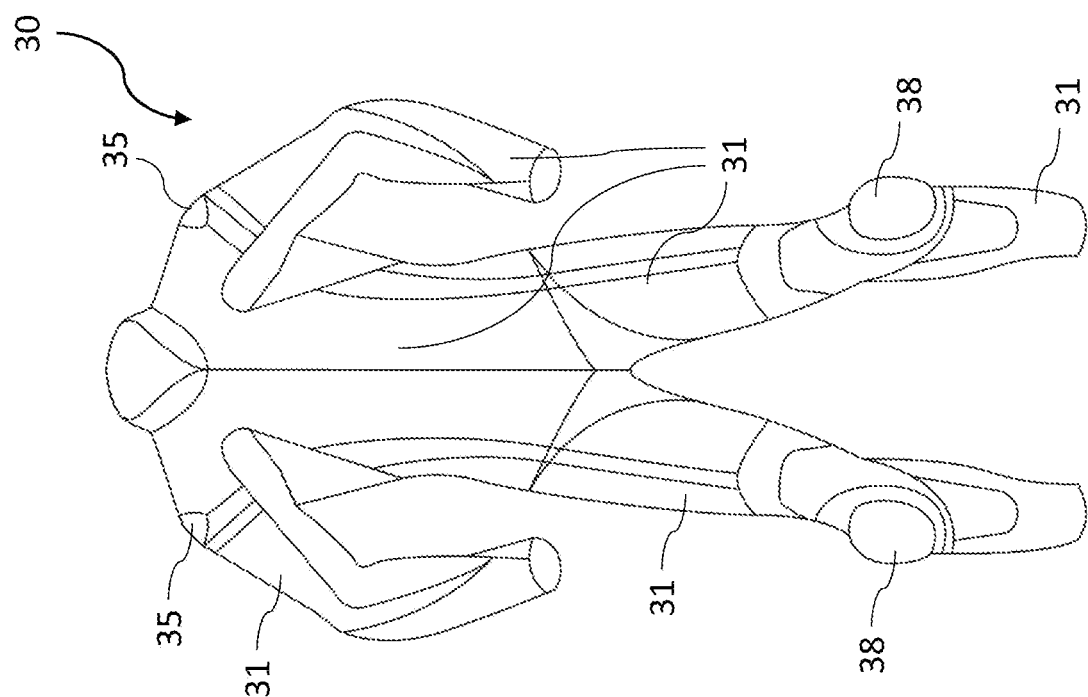
Fig 12B
PRIOR ART
Fig 12A
PRIOR ART

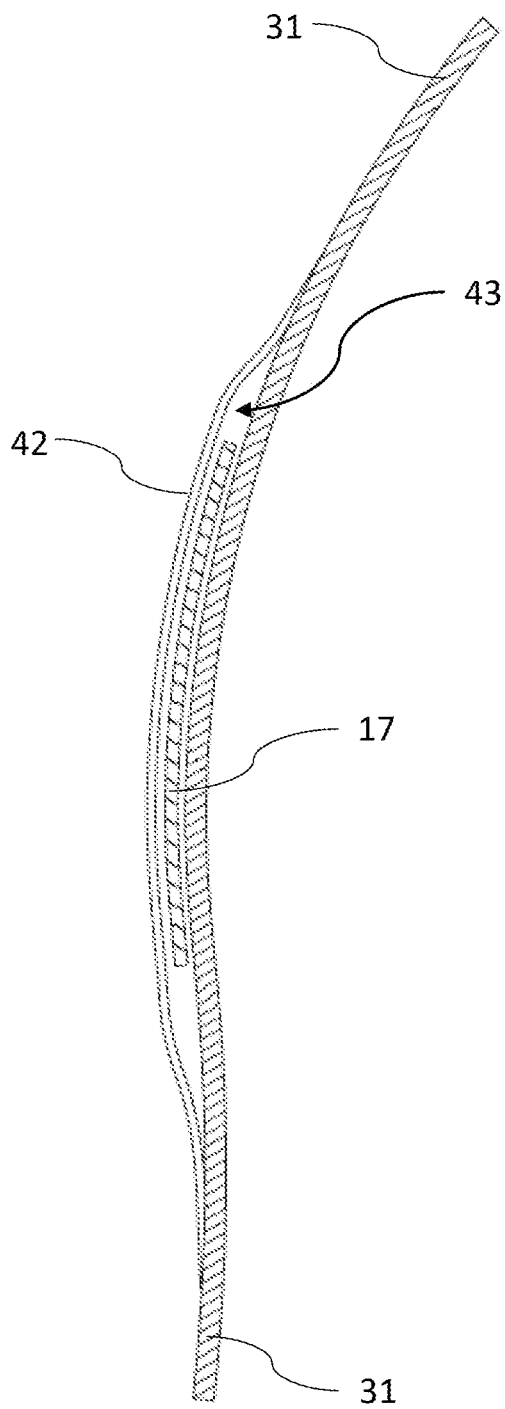
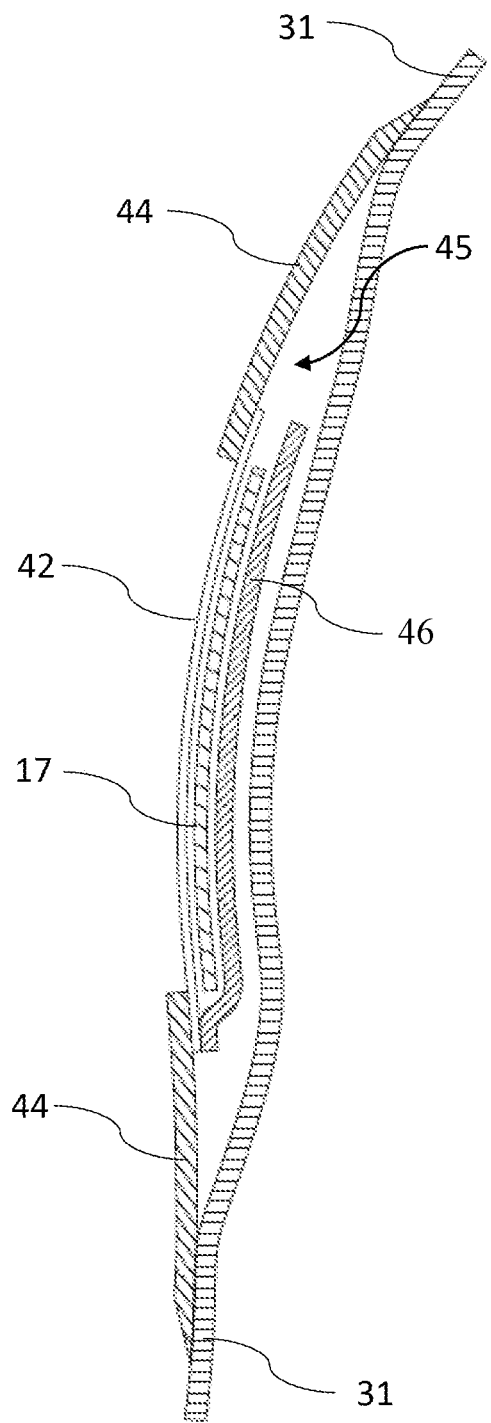
Fig 15                    Fig 16

VEHICLE BODYWORK DISPLAY SCREEN

CROSS-REFERENCE TO RELATED APPLICATIONS

This application is a 35 U.S.C. § 371 national stage application of PCT International Application No. PCT/GB2019/000091, filed on Jun. 28, 2019, which claims the benefit of Great Britain Application No. 1810799.5, filed Jun. 29, 2018 and Great Britain Application No. 1817103.3, filed Oct. 19, 2018. The contents of the above patent applications are hereby incorporated by reference in their entirety.

The present invention relates to a display screen mounted to a vehicle, to its method of manufacture and to its method of use. More particularly but not exclusively, it relates to a display screen integrated into bodywork of a car, especially a racing car. It further relates to such a display screen incorporated into a vehicle rider's protective clothing.

In the field of racing cars, whether Formula 1, Indycar, Le Mans or other types of racing, the bodywork of the car has two significant roles. The carefully-designed curvature of the bodywork provides an aerodynamic surface to optimise airflow over the car, reducing drag and providing aerodynamic downforce to hold the car to the track. Additionally, in the highly commercial area of motor sport, the bodywork provides advertising space to show sponsors' names and/or logos to best effect. For many types of racing car, these are the main roles of the bodywork, with structural loads being taken up by an internal chassis, mainly concealed within the bodywork.

Race car construction falls broadly into two main categories. One category of race car is mostly derived from production motor cars, which nowadays have a unitary metal construction to which additional components are bolted, usually including a supplementary internal roll cage for additional driver protection. This category will be referred to herein as the "GT car" category.

The other main category makes extensive use of custom-built carbon fibre composite materials, usually consisting of a strong and relatively heavy chassis of carbon fibre composites and aluminium honeycomb, to which the engine and suspension/wheels are mounted, with lightweight body panels of carbon fibre composite and polymer honeycomb being bolted around the chassis to create the aerodynamic bodywork and to provide an aesthetic outer surface to bear the team colours and sponsor logos, etc. This category will be referred to herein as the "Formula Car" category.

Popular examples of GT Cars include Nascar and International Touring Car, while popular examples of Formula Cars include Formula 1, Indycar and Le Mans Prototype (LMP). For some time now, Formula 1 has been considered to be the pinnacle of Formula Car racing, with much cutting-edge automotive technology being developed in Formula 1, before trickling down to other racing car categories, and often (eventually) to mass-production motor vehicles. (Note: Formula 1 is a registered trade mark of Formula One Licensing BV; Indycar is a registered trade mark of Brickyard Trademarks, Inc; Nascar is a registered trade mark of National Association for Stock Car Auto Racing, Inc).

Weight reduction plays a crucial part in the Formula Car category, with the result that the outer body panels are usually constructed from two very thin plies of carbon fibre composite sandwiching a core of honeycomb Nomex sheet or the like (Nomex is a registered trade mark of EI Du Pont for its meta-aramid flame-resistant woven and non-woven materials). The bodywork panels are hence very light but relatively stiff, and since they only have to cope with aerodynamic loads not major structural loads, this is sufficient. However, they are susceptible to damage from other causes. The panels are particularly prone to puncture and abrasion damage, as well as delamination. This is not only an issue during races, but also during maintenance, including paint refinishing and replacement of vinyl sponsorship graphics.

For example, the force required to pull a vinyl graphic off the bodywork can be such that the outer ply of carbon fibre delaminates from the honeycomb core. Removing old paint for refinishing a bodywork panel generally involves scraping with a bladed tool. This can breach the outer surface of the carbon fibre ply, greatly weakening it and possibly leading to delamination of the carbon fibre ply from the honeycomb core during a race. The painting process also includes a sanding step for removing old paint and for preparing the surface to apply a new primer, and it is all too easy to sand through into the carbon fibre ply below.

Repair of such damage usually requires the application of additional layers of carbon fibre over the damage, or the use of structural adhesives and fillers to bond the damaged areas back together. Further filler will also be needed to restore the shape of the bodywork panel. All of these repairs add weight to the panel, which is to be avoided, either to maximise power to weight ratios, or to allow more of a rules-defined weight limit to be used on performance-enhancing components.

A further issue for motor racing teams is to keep down costs. Formula 1 teams, for example, usually travel directly from one track to the next during the season, rarely returning to their base of operations. Damaged bodywork may well require separate return to the base of operations for repair or refinishing in addition to normal logistic requirements. If a painted graphic on a bodywork panel is to be changed between races, e.g. due to new sponsorship deals, then the panel would again have to be returned to base to be modified and sent on to meet the team at its next event. Additional body panels will need to be carried, in case those being repaired or refinished are not ready in time or cannot be repaired. Thus, many different additional costs will occur as a result of the need to refinish panels or to change panels finishes voluntarily.

Yet another issue is time management. At many events, such as Formula 1 Grands Prix, limited amounts of time are available to work on the car. Time spent on processing bodywork repairs is time not spent on more fundamental issues. It is possible that bodywork panels and the like may not be available at convenient times, requiring unscheduled transportation or simply not being available for a race, due to insufficient time between events.

The business models of most motor racing teams are heavily dependent on sponsorship and hence on graphics on the cars to display this sponsorship. It is similarly essential to display the team's own branding on the cars. Advertising revenue will be dependent on showing relevant marks and graphics to best effect, and as responsively as possible to any changes. Voluntary changes in graphics are hence just as important as remedial work.

The application of graphics such as logos to race cars is currently carried out by two main methods, painting them on or applying pre-formed "graphics" of self-adhesive vinyl sheet.

Painted graphics give a very good visual finish, but disadvantages include the time taken to paint a design on to a bodywork panel; that complicated designs are difficult to apply and some have been found impossible to paint; and changing a graphic requires repainting. Overpainting is unacceptable, for example on weight grounds, and the old design has been known to show through the new one on top. Stripping off an old painted design produces a significant time delay before the new design can be applied. In any case, stripping the old paint causes wear and tear on the relatively fragile body panels. This can lead to more delay for repairing the wear and tear—which then adds to the weight of the panel anyway. Also, complex repainting requires specialist facilities not available at the race track, so panels have to be sent away, wasting time and increasing costs.

Thus, changing painted graphics has weight, cost and time implications. In extreme cases, these constraints may make it preferable to buy or produce extra bodywork parts for painting with different graphics. Ultimately, if an advertiser changes, and it is not possible to display the new advertising at the next race, the new advertiser will not pay and the old advertiser will benefit from free publicity.

Self-adhesive vinyl graphics have the benefit of rapid application and removal, but also have several disadvantages. A vinyl graphic has a significant thickness, causing a step on the surface of the bodywork. Such a step can be sufficient to interfere with smooth airflow across the surface of the bodywork, having an appreciable adverse effect on the aerodynamics of the race car. Such steps are frequently visible, producing a poor visual aesthetic. Close up to the car, the steps can be felt if a hand is run across the panel.

As referred to above, the removal of a vinyl graphic causes stresses in the underlying substrate, which can cause the underlying paint finish to peel off. Thus, stripping and repainting will be needed, which themselves can result in wear and tear on the bodywork, leading to repairs, which add weight. The stress of peeling off a vinyl graphic can even lead to delamination of the structure of the bodywork panel itself, again requiring repair and added weight, or even replacement.

Application of a vinyl graphic has a finite chance of trapping air bubbles beneath the vinyl sheet, leading to an inferior visual aesthetic, or the need to peel off and reapply the graphic. This naturally runs a further risk of peeling off the paint or delaminating the layered bodywork structure.

In any case, vinyl graphics cannot be made with the high gloss levels of automotive paintwork, and are less smooth on a visible scale, both effects making the vinyl graphics stand out visually from the painted bodywork, making them appear low quality and aesthetically compromised.

Thus, the use of vinyl graphics also has weight, cost and time implications, largely arising from the real chance of damage to paint and bodywork laminates during removal. This leads to the same set of problems as for painted graphics, ultimately leading to the choice of having to procure more spare bodywork panels or being unable to change a graphic in time for the next race.

The need to change bodywork logos and other graphics so often stems from current methods for arranging advertising on race cars. While major teams usually have major sponsors and advertisers able to pay for a space on a car for a complete season of races, minor teams tend to rely more on a larger number of smaller advertisers, many of which will only be able to afford to rent space on the car for a few races. There is hence a need for frequent changes of graphics, every time one of the advertisers changes.

As shown above, it is difficult to change the graphics quickly and any changes can lead to bodywork damage. It is hence preferable to try to book advertising to appear over many races, and the most visible (and hence valuable) locations on the bodywork would ideally be committed to one advertiser/sponsor. This allows little commercial flexibility and it is hard to earn as much as if multiple advertisements could be shown. It would also tend to restrict advertising to multi-national companies, rather than allowing an advertiser to buy space on the bodywork for only its "home" Grand Prix, for example.

Ideally, one might want to show several alternative advertisements during the same race, especially for the minor teams that are unable to attract the "high value" sponsors. However, current application methods require physical contact for a significant time. In a Formula 1 Grand Prix under 2018 rules, cars stop in the pits to change tyres once or twice a race, typically for a few seconds at a time, so no graphic changes are possible—even a few more seconds stopped to replace damaged bodywork can be enough to ruin a driver's chances in a race, so extra time to change graphics would not be possible.

Nevertheless, if it were to be possible to sell advertising in blocks of a few laps, rather than a few races, then the overall value of the advertising space would rise. The economics of advertising (in cases where changes are simple and low cost) almost always shows that for example a dozen five minute slots competed over by multiple advertisers are more valuable than a single slot one hour long that fewer could afford anyway.

Similar considerations apply to the sport of motorcycle racing, in particular for track racing formulas such as MotoGP and Superbike racing. Motorcycles designed for these races have significant areas of curved cowlings and other bodywork, on which is displayed team logos, sponsors' branding, advertisements, rider identification and so forth, in a similar manner to racing cars. These cowlings, etc., are normally made from sheets of carbon fibre composites, similar to formula car bodywork. The problems and opportunities set out above for racing cars are thus equally applicable to racing motor cycles, with the added issue that the area of bodywork on a racing motorcycle being significantly less than on a racing car, so advertising space is at a premium.

Since the rider of a racing motorcycle is far more exposed to view than the driver of a racing car, the rider's protective gear, especially his or her protective bodysuit, the "leathers", has also become a prominent site for advertising and other graphics. It would thus be just as useful if any method and equipment suitable for improved display of advertising material on racing cars and racing motorcycles could also be applied to a rider's or even a driver's protective clothing and other gear.

It is hence an object of the present invention to provide apparatus for displaying such graphics on bodywork of a vehicle, such as a racing car or a racing motorcycle, and/or on the protective gear of a driver/rider, that obviates the above disadvantages of existing approaches and allows graphics to be changed responsively, rapidly, effectively, cheaply, and without risking the integrity of the bodywork panels at every change. It is also an object of the present invention to provide a method for manufacturing such apparatus. It is a further aspect of the present invention to provide an improved method of arranging the sale and presentation of advertising space on a vehicle, using such apparatus.

According to a first aspect of the present invention, there is provided a bodywork element for a vehicle, adapted for the external display of controllably selectable images, comprising a bodywork panel having an aperture formed therein, a inset panel of optically clear plastics material filling said aperture, with an outer surface of the inset panel extending flush with an outer surface of the bodywork panel and being formed to continue a surface profile of the bodywork panel, and flexible display screen means mounted to an inner face of the inset panel so as to be visible through the inset panel, the display screen means being operatively connected or connectable to control means for the display screen means, said control means being adapted to control the display screen means to display a selected image.

In a preferred embodiment, the display screen means comprises a reflective display screen means.

Preferably, a volume defined between an inner surface of the inset panel and an adjacent display surface of the display screen means is filled with an optically clear solid, liquid or gel material.

Advantageously, the display screen means is mounted to the inner surface of the inset panel by means of a continuous, void-filling layer of optically clear adhesive.

Preferably, a filler material is inserted along a join between an inner circumference of the aperture in the bodywork panel and an outer circumference of the inset panel, so as to fill any gaps between the bodywork panel and the inset panel.

The filler material may also be shaped to blend together a surface profile of the bodywork panel and a surface profile of the inset panel.

Advantageously, the bodywork panel is coated with a conventional paint finish, which is feathered over a marginal zone of the inset panel, camouflaging the join and an outer rim of the display screen means beneath the inset panel.

Advantageously, the bodywork panel may instead be coated with a conventional paint finish extending across a marginal zone of the inset panel to camouflage the join, wherein a shape of the inset panel and a shape of an inner edge of the conventional paint finish are substantially different, thus obscuring the shape of the inset panel and a shape of the display screen means beneath the inset panel.

Preferably, the aperture in the bodywork panel is formed with a rebate on an outer or an inner surface of the panel, extending around the circumference of the aperture.

Advantageously, the inset panel is then profiled around its circumference to conform to said rebate, optionally so as to form an interference fit therewith.

In a preferred embodiment of this aspect, the inset panel is mounted permanently to the bodywork panel.

In an alternative embodiment of this aspect, the inset panel is releasably mounted to the bodywork panel.

In either said embodiment, the display screen means may be mounted permanently to the inset panel.

Alternatively, the display screen means may be selectably detachable from the inset panel.

Preferably, the control means comprises part of the bodywork element and is mounted thereto.

Alternatively, the control means is mounted to the vehicle away from the bodywork element, with a detachably wired or wireless operative connection between the control means and the display screen means.

Preferably, the control means is wirelessly operatively connectable to remote server means, by which image data and/or display instructions may be transmitted to the control means.

Thus, an operator using the remote server means may transmit instructions and optionally new image data regarding a particular image to the control means, which will in turn control the display screen means to display said image.

Alternatively, or additionally, the control means may be programmed to change between images displayed at pre-selected times, without external instructions.

Alternatively or additionally, the control means may be linked to sensor means on the vehicle, providing data including vehicle speed and location, and the control means is then programed to change images displayed in response to signals received from said sensor means.

Thus, a particular pre-selected image may be displayed when the vehicle is in the pit lane and stopped in the pits, for example.

In a preferred embodiment, the bodywork element has a plurality of apertures formed therein, each aperture being filled by a corresponding inset panel and having a respective display screen means mounted to the inner face of each inset panel.

The plurality of display screen means may each be operatively connected or connectable to a respective control means.

Alternatively, the plurality of display screen means may be operatively connected or connectable to a single control means.

In a preferred embodiment, the vehicle comprises a racing motor car.

The racing motor car may be a Formula Car as defined hereinabove.

Alternatively, the racing motor car may be a GT Car as defined hereinabove.

In another preferred embodiment, the vehicle comprises a racing motor cycle.

According to a second aspect of the present invention, there is provided a method for producing a bodywork element for a vehicle, adapted for the external display of controllably changeable images, comprising the steps of:
  providing a bodywork panel having an aperture formed therein,
  providing an inset panel of optically clear plastics material shaped to fit said aperture and formed to match a surface profile of the bodywork panel;
  fitting said inset panel into said aperture;
  providing flexible display screen means;
  mounting the flexible display screen means to an inner face of the inset panel so as to be visible through the inset panel; and
  arranging an operative connection between the flexible display screen means and control means for the display screen means, said control means being adapted to control the display screen means to display a selected image.

Preferably, the control means is mounted to the bodywork element.

Advantageously, the control means is adapted to receive image data and instructions from a remote server means, optionally by radio.

Preferably, the display screen means comprises a reflective display screen means.

Preferably, the method comprises the step of filling any volume extending between the inner surface of the inset panel and a display surface of the display screen means with an optically-clear solid, liquid or gel material.

Advantageously, the display screen means is mounted to the inner surface of the display screen means by means of a continuous, void-filling layer of optically-clear adhesive.

Preferably, said bodywork element comprises a bodywork element as described in the first aspect above.

According to a third aspect of the present invention, there is provided a method for arranging the display of advertising images on a vehicle, comprising the steps of: providing a vehicle and at least one bodywork element for the vehicle as described in the first aspect above;

mounting said at least one bodywork element to the vehicle;

providing at least one set of instructions to generate an advertising image on display screen means of a bodywork element;

storing said at least one set of instructions on control means operatively connected to display screen means of the bodywork element, or on server means remotely operatively connected to said control means;

agreeing conditions under which a particular advertising image is to be displayed; and under said conditions causing the control means to pass a particular set of instructions to the display screen means such that it displays said particular image.

Preferably, said conditions comprise specified periods of time, e.g. during a race.

Advantageously, said conditions comprise specified vehicle locations, vehicle speeds or the like.

According to a fourth aspect of the present invention, there is provided a piece of protective equipment for a rider or driver of a vehicle, adapted for the external display of controllably selectable images, comprising a panel of optically clear plastics material and flexible display screen means mounted to an inner face of the optically clear panel so as to be visible through the optically clear panel, the optically clear panel being mounted or mountable to the piece of protective equipment and the flexible display screen means being operatively connected or connectable to control means for the display screen means, said control means being adapted to control the display screen means to display a selected image.

Preferably, said display screen means comprises reflective display screen means.

Preferably, said piece of protective equipment comprises a piece of protective clothing.

Advantageously, said piece of protective clothing comprises a protective bodysuit or "leathers" for wear by a rider of a racing motorcycle.

Preferably, the panel of optically clear material comprises a flexible optically clear material.

The panel of optically clear material may then be sewn to the protective equipment, optionally being sewn to a flexible zone of a piece of protective clothing.

The panel may alternatively be sewn to the protective equipment behind an aperture formed in an outer layer of the protective equipment.

Alternatively, the panel of optically-clear material comprises a rigid optically clear material.

The panel of optically clear material may then be fastened to a rigid zone of a piece of protective clothing, optionally being shaped to conform to a surface profile of said rigid zone.

According to a fifth aspect of the present invention, there is provided a bodywork element for a vehicle, adapted for the external display of controllably selectable images, comprising a bodywork panel having an aperture formed therein, a inset panel of optically clear plastics material filling said aperture, with an outer surface of the inset panel extending flush with an outer surface of the bodywork panel and being formed to continue a surface profile of the bodywork panel, and reflective display screen means mounted to an inner face of the inset panel so as to be visible through the inset panel, the display screen means being operatively connected or connectable to control means for the display screen means, said control means being adapted to control the display screen means to display a selected image.

Embodiments of the present invention will now be described more particularly and by way of example, in which:

FIGS. 12A and 12B are front and rear elevations respectively of a typical set of motorcycle racing "leathers";

FIG. 15 is a scrap cross-section of a portion of a set of motorcycle racing leathers, fitted with a pocket holding a display screen; and FIG. 16 is a scrap cross-section of a portion of a set of motorcycle racing leathers, fitted with an alternative pocket holding a display screen.

Figure 1:
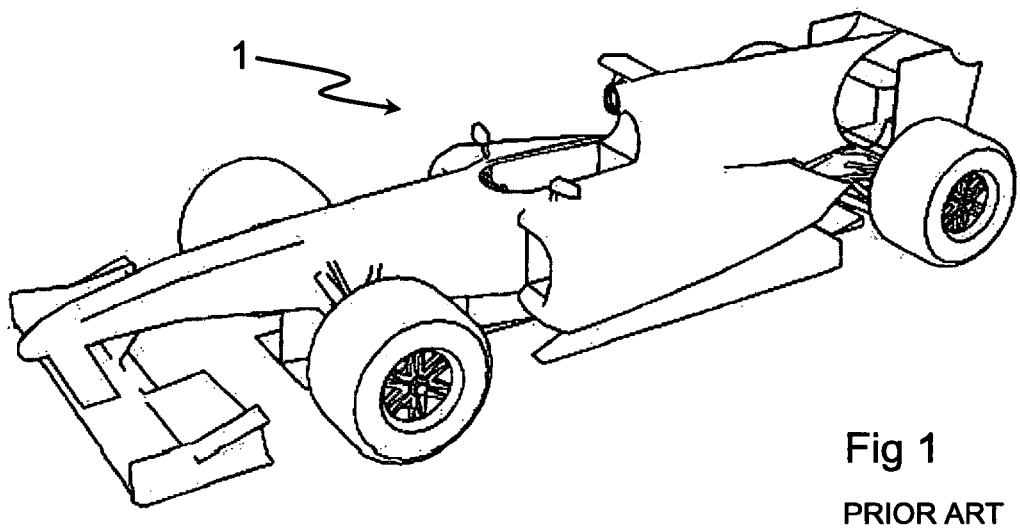
FIG. 1 is a perspective view of a motor racing car of typical "Formula car" construction.
Figure 2:
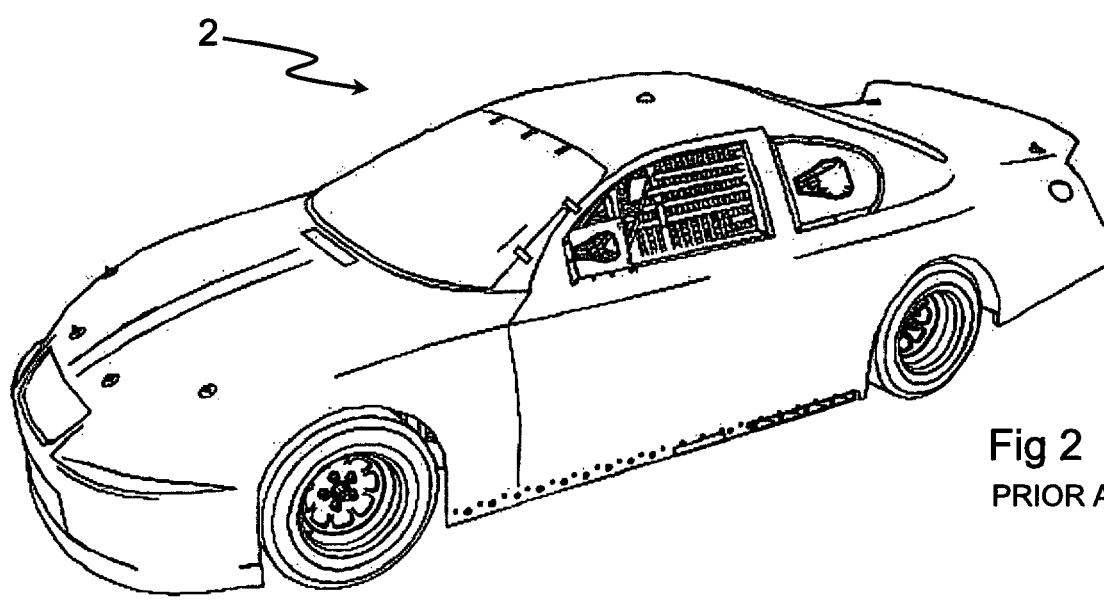
FIG. 2 is a perspective view of a motor racing car of typical "GT car" construction.

Referring now to the Figures and to FIGS. 1 and 2 in particular, FIG. 1 shows a typical Formula Car form of motor racing car 1, here a Formula 1 car. As can be seen, this has a body shell shaped mainly in the interests of high-speed aerodynamics, with pronounced curvature, both convex and concave. The bodywork still needs to be used as the substrate for multiple logos, brand names and other insignia for long-term sponsors and shorter-term advertisers, as well as team and driver branding.

FIG. 2 shows a typical GT car 2. While such motor racing cars are limited to being based on conventional road-going motor cars, the bodywork still tends to be curved for aerodynamic effect, and is used as the substrate for logos, branding and the like for teams, sponsors, advertisers and drivers.

Figure 3:
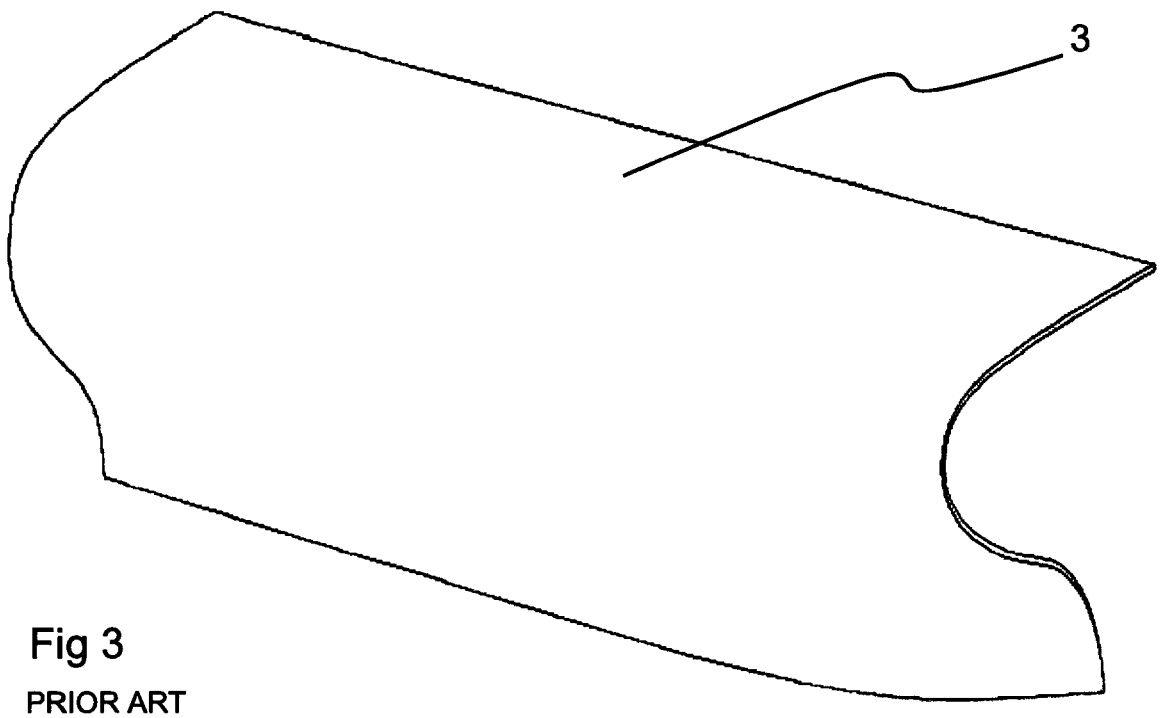
FIG. 3 is a perspective view of a sidepod bodywork panel from the racing car of FIG. 1.

FIG. 3 shows a typical bodywork panel 3 from a Formula 1 racing car 1. These panels are generally bolted to a monocoque chassis, and are routinely removable, for example to replace damaged panels, to access interior workings of the car, or (between races) to be replaced with panels with improved aerodynamic profiles.

Figure 4:
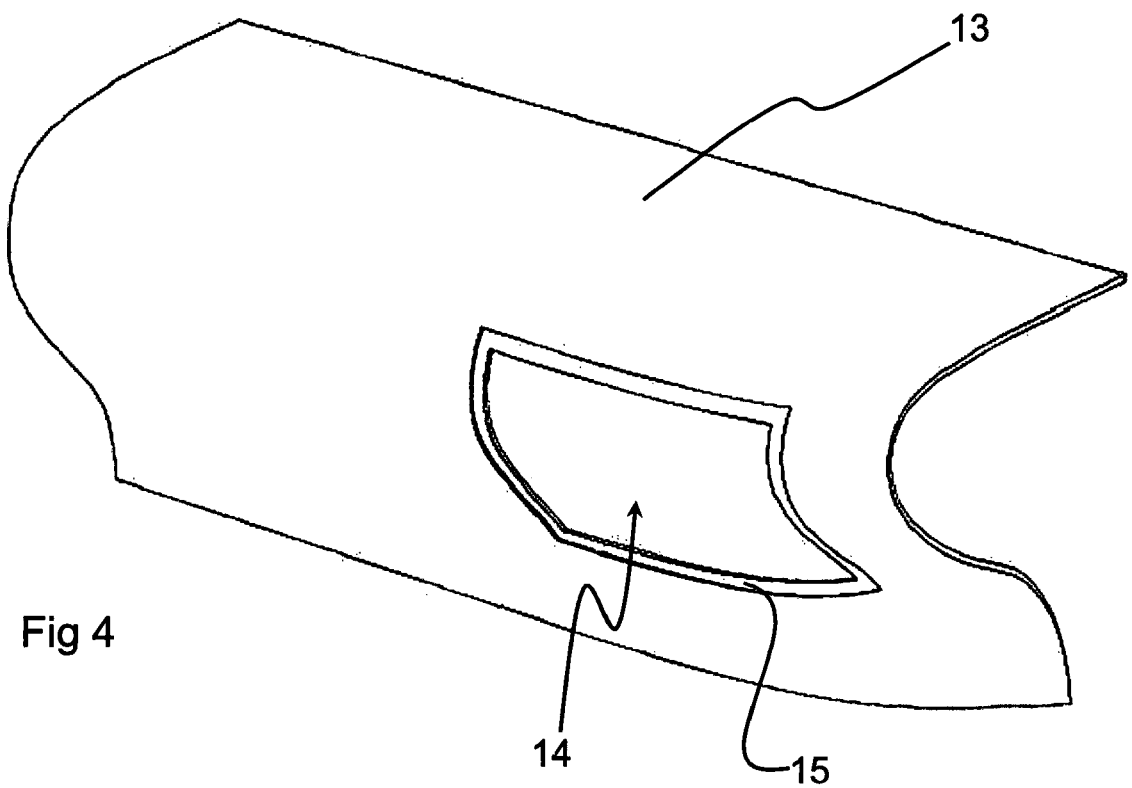
FIG. 4 is a perspective view of a sidepod bodywork panel for the racing car of FIG. 1, embodying the present invention.

In the present invention, as shown in FIG. 4, the bodywork panel 3 is replaced by a modified bodywork panel 13, in which an aperture 14, here generally rectangular, has been formed. It is generally easier with bodywork panels 13 of Formula cars 1 to create such apertures 14 as the panels 13 are produced, due to the materials of construction (see FIG. 5 below). For GT cars 2, which typically have metal bodywork panels, it may be easier to cut a suitably-shaped aperture 14 into a pre-formed bodywork panel 3. In either case, it is desirable to have a shallow rebate 15 created, extending around a circumference of the aperture 14, facing an exterior of the bodywork panel 3, 13.

Figure 5:
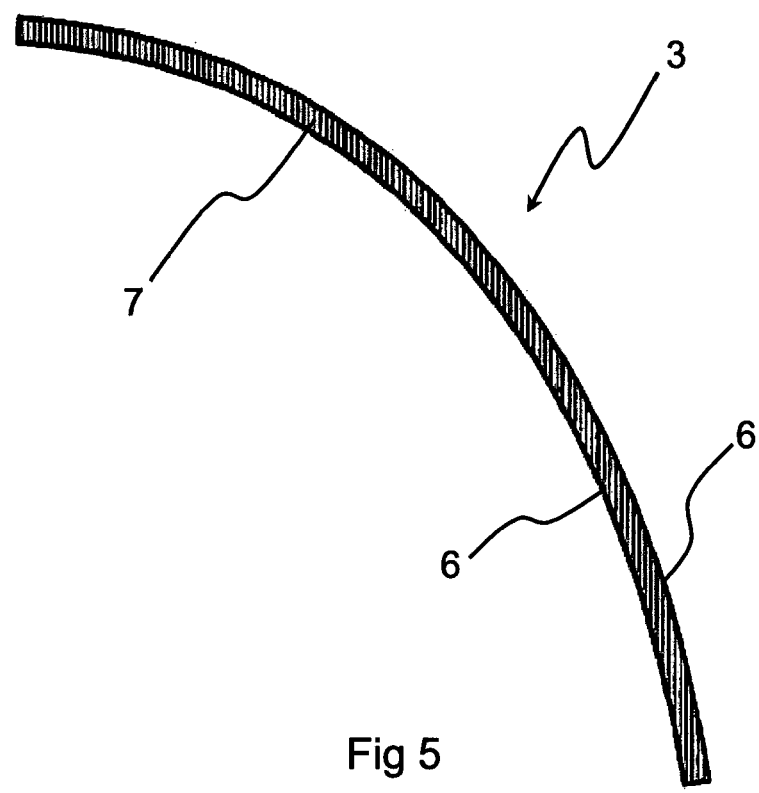
FIG. 5 is a scrap cross-section of the bodywork panel of FIG. 3, showing its internal structure.

FIG. 5 shows the typical structure of a bodywork panel 3 of a Formula car 1. Since total car weight is critical, these are usually constructed for minimum weight with just sufficient strength and stiffness. Two plies 6 of carbon fibre composite material, each typically 0.5 mm thick, sandwich a core 7 of Nomex paper honeycomb approximately 5 mm thick (Nomex is a registered trade mark of Du Pont). Each bodywork panel 3 is moulded to exactly the required profile before the carbon fibre composite plies 6 are curved. While such bodywork panels 3 are thicker than a conventional metal panel, they are stronger and stiffer for a given weight.

Figure 6:
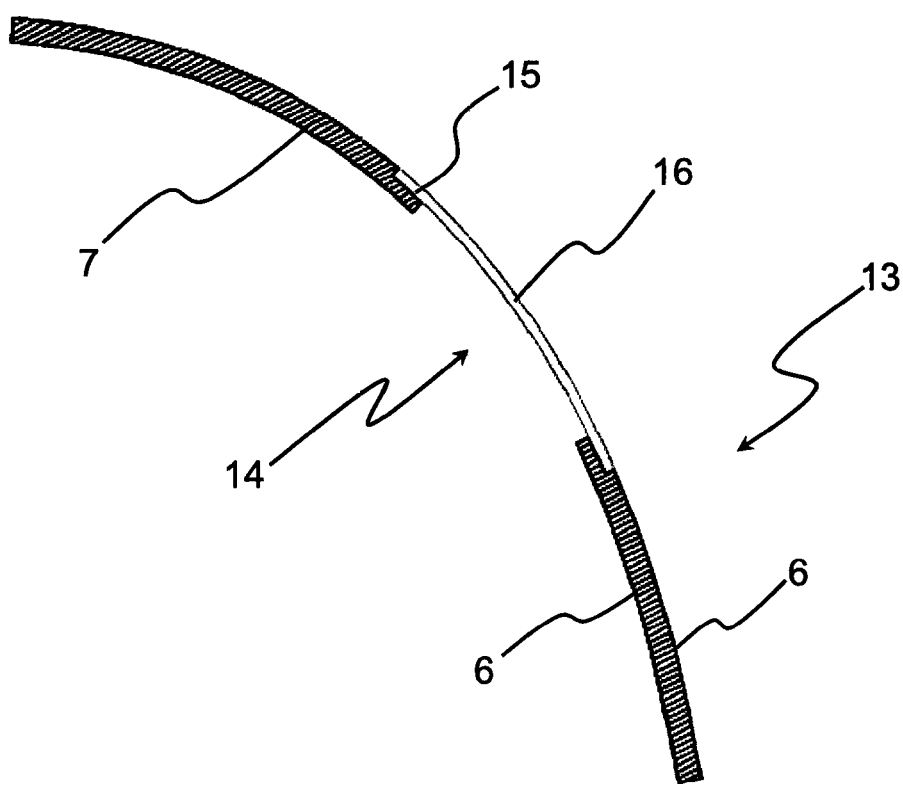
FIG. 6 is a scrap cross-section of the bodywork panel of FIG. 4, taken across the aperture formed therein.

FIG. 6 shows in cross-section a bodywork panel 13 with an aperture 14 as in FIG. 4. As a first step towards installing a display screen, an optically clear plastics panel 16 has been moulded (for example from poly(methyl methacrylate)), to fit across the aperture 14, with an outer margin of the optically clear panel 16 supported by the rebate 15 formed around the circumference of the aperture 14. An external profile of the optically clear panel 16 is shaped to continue an external profile of the bodywork panel 13, so that the aerodynamic performance of the bodywork panel 13 is unaffected. Any peripheral gaps between an outer circumference of the optically clear panel 16 and the bodywork panel 13 are filled and blended with conventional body filler materials to eliminate as far as possible any discontinuities in an exterior surface of the bodywork panel 13. In this embodiment of the present invention, the optically clear panel 16 is fixed to the rebate 15 with a suitable conventional adhesive.

When the bodywork panel 13 is subsequently painted in the team or sponsor colours, the paint finish can be extended over the join between the bodywork panel 13 itself and the optically clear panel 16 and feathered inwardly over a marginal region of the optically clear panel 16. This is partly to conceal the joint between the bodywork panel 13 and the optically clear panel 16, both visually and on a microscopic physical scale to maintain aerodynamics smoothness (a further benefit is described below).

Figure 7:
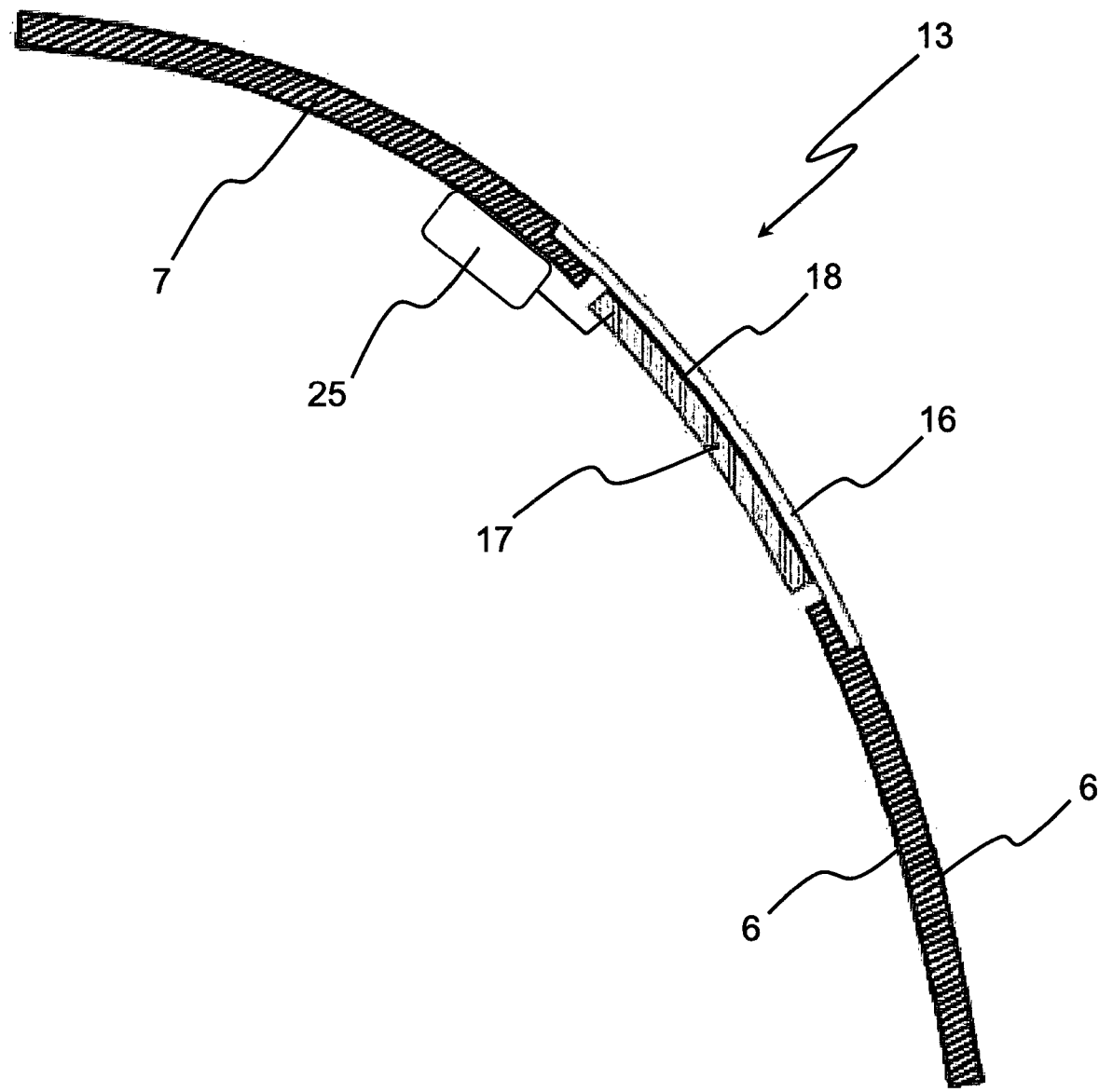
FIG. 7 is a scrap cross-section of the bodywork panel of FIG. 4, with a display screen fitted according to a first embodiment of the present invention.

FIG. 7 shows a scrap-cross section of a bodywork panel 13 with a display screen fitted according to a first embodiment of the present invention. Here, a flexible display screen 17, ideally a reflective electronic display such as that conventionally known as "e-paper", is mounted to an interior surface of the optically clear panel 16, by means of a layer of optically clear adhesive 18. It is important that the optically-clear adhesive 18 completely fills any voidage between contacting faces of the flexible display screen 17 and the optically clear panel 16, to make images displayed on the flexible display screen 17 as clearly visible as possible from outside the bodywork panel 13.

Such e-paper flexible display screens 17 can nowadays be made to display colours, as well as the original black and white displays to simulate ink on paper. When images are displayed on the flexible display screen 17 (see below), a background to the images can be made substantially the same colour as the paint finish of the bodywork panel 13, and in combination with the feathered edge to the paint finish around the margin of the optically clear panel 16 (described above), this should make the optically clear panel 16 visually blend seamlessly into the bodywork panel 13, making it appear as if the displayed images were displayed on the surface of the bodywork panel 13.

NB: It is considered beneficial to use reflective display screens 17 in this invention because it allows an image to be displayed at the same brightness level as the surrounding bodywork in all lighting conditions (including the artificial lighting experienced in night racing, as at some Grands Prix). Thus, the image can more readily be made to simulate a painted design, while remaining controllably changeable as desired.

An alternative approach is for the paint finish to be extended over the join between the bodywork panel 13 and the optically clear panel 16, but for a shape of the inner edge of the paint finish not to correspond to a shape of the outer edge of the optically clear panel 16 or to a shape of an outer edge of the display screen 17 beneath the optically clear panel 16. (Typically, the aperture 14, the optically clear panel 16 and the display screen 17 would all be generally rectangular). Thus, the join is camouflaged and the shapes of the optically clear panel 16 and display screen 17 are obscured.

This allows the creation of an illusion of a standalone painted graphic on a background having a colour contrasting with a remainder of the bodywork. (For example, in the 2018 version of the traditionally all-over red Ferrari livery, there is a trapezoidal or "keystone" shaped white area on the nose that acts as a contrasting background for the car number.) A similar shape for an inner margin of the paint finish of a bodywork panel of the present invention would create a "frame", concealing the rectangular shape of the optically clear panel and the display screen, distracting the viewer's eye from their true shape, and allowing the display of images on a contrasting background of specified shape or on a background of the same colour blending into the overall bodywork paint finish.

The images displayed on the flexible display screen 17 are controlled via a display controller 25, here shown schematically, which is linked by radio to a remote server, located adjacent the racing track, for example in the "pits". This allows transmission of instructions, via the display controller 25, to change the images shown on the flexible display screen 17 as desired.

Figure 8:
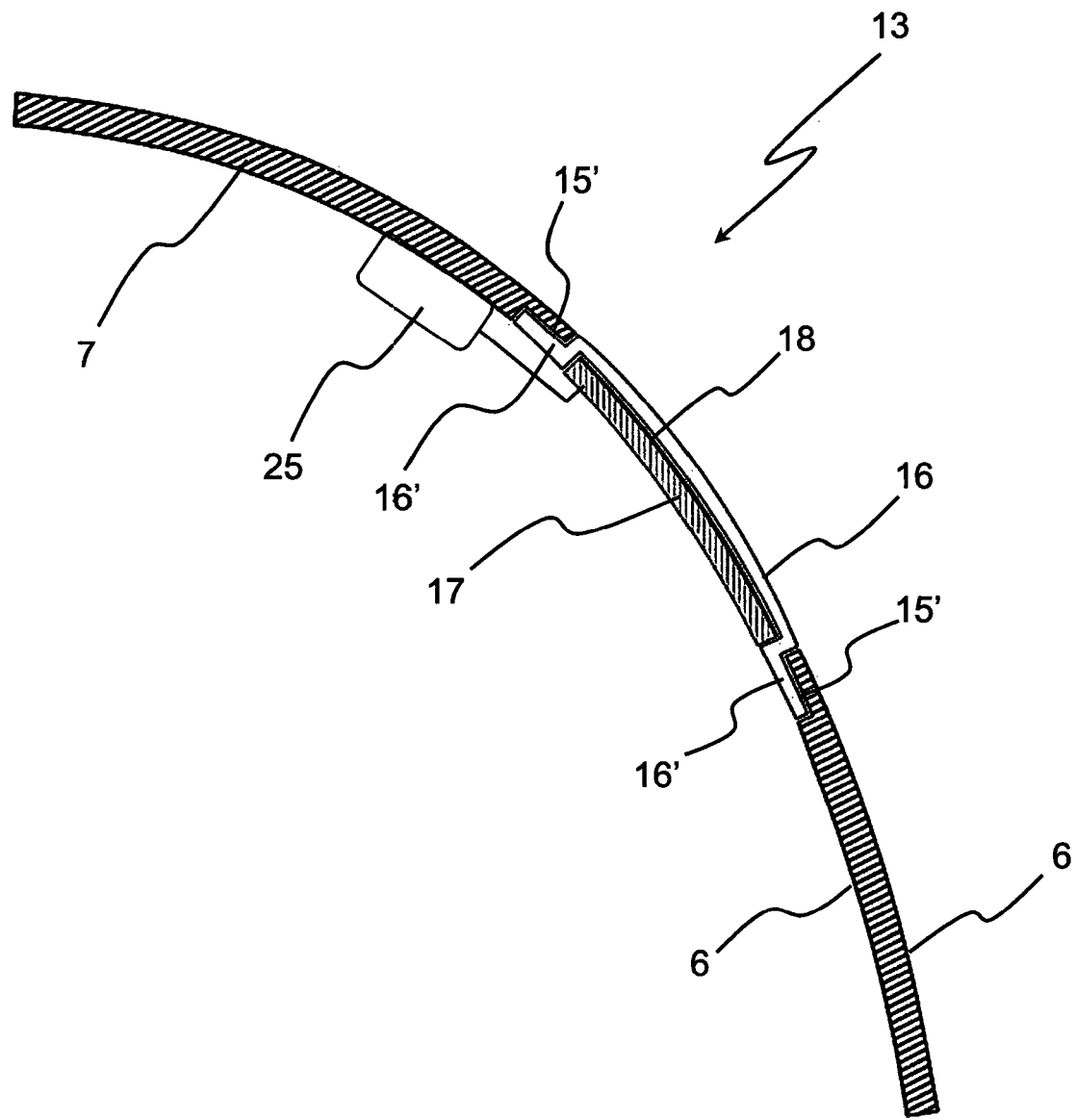
FIG. 8 is a scrap cross-section of the bodywork panel of FIG. 4, with a display screen fitted according to a second embodiment of the present invention.

FIG. 8 shows a bodywork panel 13 with a display screen fitted according to a second embodiment of the present invention. This is broadly similar to the first embodiment, described above, except that instead of there being a rebate 15, around an edge of the aperture 14 in the bodywork panel 13, that faces outwardly, there is a rebate 15' that faces inwardly. The optically clear panel 16 is moulded with an outer marginal zone 16' that fits into the inwardly-facing rebate 15', while a remaining central portion of the optically clear panel 16 has an external profile that is shaped to continue that external profile of the bodywork panel 13. As above, any peripheral gaps between an outer circumference of this central portion of the optically clear panel 16 and the bodywork panel 13 are filled and blended with body filler to eliminate discontinuities in an exterior surface of the bodywork panel 13. The optically clear panel 16 is here held in place by conventional adhesive applied between the inwardly-facing rebate 15' and the outer marginal zone 16' of the optically clear panel 16. The paint finish on the bodywork panel 13 is again preferably extended across the external join between the bodywork panel 13 and the optically clear panel 16, for both aerodynamic and cosmetic reasons.

In this second embodiment, a flexible reflective display screen 17, such as e-paper, is mounted to an interior surface of the central portion of the optically clear panel 16, by means of a layer of optically clear adhesive 18, very much as in the first embodiment (see above and FIG. 7). The images displayed on the flexible reflective display screen 17 are controlled via a display controller 25, linked by radio to a remote server located adjacent the racing track, allowing transmission of instructions to change the images shown on the flexible display screen 17, again as described above.

Figure 9:
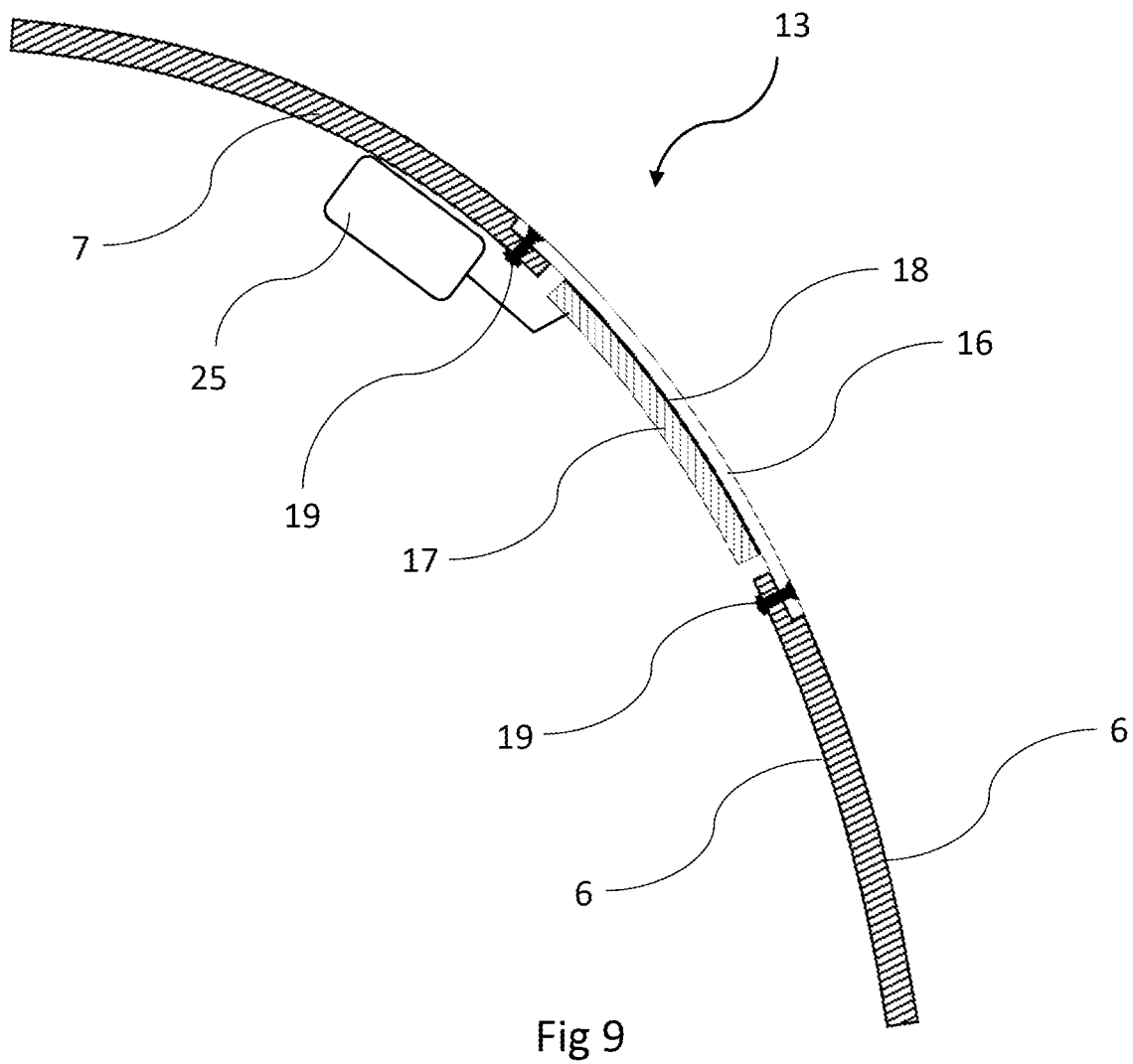
FIG. 9 is a scrap cross-section of the bodywork panel of FIG. 4, with a display screen fitted according to a third embodiment of the present invention.

FIG. 9 shows a bodywork panel 13 with a display screen fitted according to a third embodiment of the present invention. A flexible display screen 17 of e-paper, substantially identical to that shown in FIGS. 7 and 8, is mounted to an interior surface of the optically clear panel 16 by a layer of optically clear adhesive 17, again as described above for FIGS. 7 and 8. In this case, the optically clear panel 16 is fixed to the external rebate 15 around the aperture 14 in the bodywork panel 13 by means of screw or bolt fittings 19. These could be used in addition to the adhesive used in the arrangement of FIGS. 7 and 8, but in this case, they allow the optically clear panel 16 and attached flexible display screen 17 to be unfastened, removed and replaced as a unit, for example if the optically clear panel 16 has itself been damaged (e.g. by debris flung up from the track or by collision) or if the flexible display screen 17 has become defective and needs repair or replacement.

This arrangement, like that shown in FIGS. 7 and 8, has a display controller 25 operatively linked to the flexible display screen 17 and to a remote server, so that the images on the flexible display screen 17 can be controlled as desired.

Figure 10:
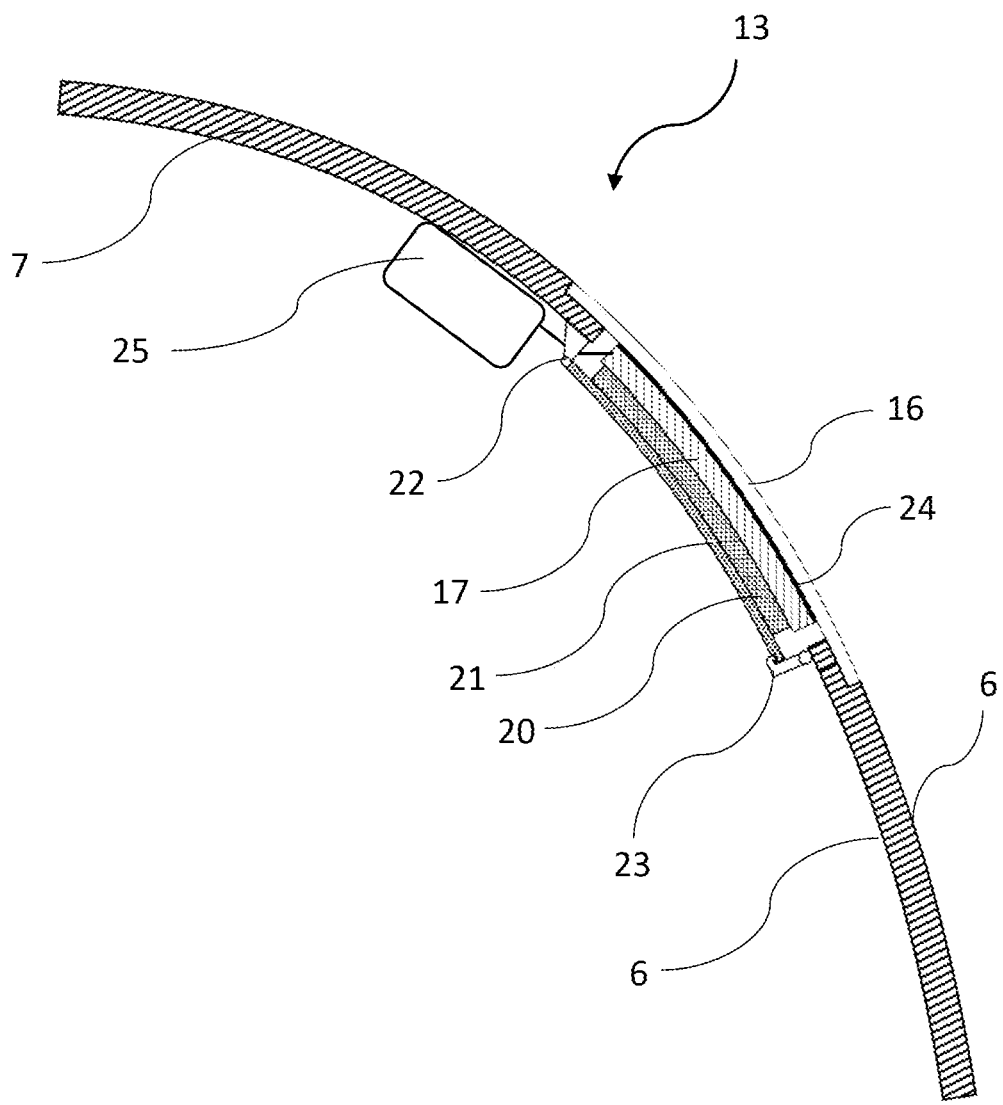
FIG. 10 is a scrap cross section of the bodywork panel of FIG. 4, with a display screen fitted according to a fourth embodiment of the present invention.

FIG. 10 shows the bodywork panel 13 with a display screen fitted according to a fourth embodiment of the present invention. The flexible display screen 17 of e-paper is substantially the same as in FIGS. 7 to 9, and the optically clear panel 16 is glued to the external rebate 15 as shown in FIGS. 6 and 7. In this case, however, the flexible display screen 17 is held against the interior surface of the optically clear panel 16 by a substantially co-extensive resiliently compressible foam pad 20, which itself is held in place by a retaining panel 21. The retaining panel 21 is mounted to an interior face of the bodywork panel 13 by a hinge mounting 22 located to a first side of the aperture 14, and a detent clip mounting 23 located adjacent a second side of the aperture 14 remote from the first. When the retaining panel 21 is clipped in place by the detent clip mounting 23, the foam pad 20 is compressed between the retaining panel 21 and the flexible display screen 17, holding the latter securely in place. In place of the optically clear adhesive 18 used as shown in FIGS. 7 to 9, an optically clear grease 24 is here used to fill any voidage between the respective contact faces of the flexible display screen 17 and the optically clear panel 16, maximising the visibility of images shown on the flexible display screen 17. An alternative to the grease 24 would be to use a pad of optically clear gel (not illustrated). As described for the other arrangements shown, the flexible display screen 17 is controlled via the display controller 25 from a remote server.

In this arrangement, the flexible display screen 17 can readily be removed from the particular bodywork panel 13, either to be replaced if it has become defective or needs to be upgraded, or to allow it to be transferred to a different bodywork panel 13, perhaps having different aerodynamic curvature.

Multiple display screens 17 can be fitted into the same bodywork panel 13, and/or multiple bodywork panels 13 of the car 1 can be fitted with a display screen 17. While each such display screen 17 may be connected to its own individual display controller 25, it would also be possible to have a single display controller 25 controlling multiple display screens 17. The exact balance probably depends on the weight of the display controllers 17 and the weight and complexity of the wiring loom needed if multiple display screens 17 were operatively connected to a small number of display controllers 25.

In a simpler embodiment of the invention (not illustrated), the display controller 25 would not be connected to a remote server, but instead would be set up before a race, preprogrammed with a sequence of images to be shown for specified periods of time. This would not be as responsive as the main embodiments, above, with control in real time from a remote server. However, in less "high-tech" venues than the typical Grand Prix race track, this simpler version of the system might be more practicable.

Each of the arrangements shown in FIGS. 7 to 10 thus allow images of choice, typically advertising logos or the like, to be displayed as if painted on the bodywork panel 13, while allowing the images to be changed as often as desired. While this could be used, for example, to display car performance data to spectators, the main use of this facility is likely to be advertising and sponsorship logos, as will be described below.

The images displayed and changed using the arrangements described about can be simple logos or more complicated images including text, although they will mainly be viewed at a distance and on a fast-moving vehicle, so the level of detail that is worthwhile may be limited. Similarly, moving images would technically be possible, but their usefulness would depend on how far movement of the image could be discerned by a viewer.

As a general rule, the images will be generated so that they have a background to the logo, text, etc, which corresponds in colour to the paint finish of the respective bodywork panel. Thus, the logo, text, etc will appear to be applied over a continuous background extending over the whole bodywork element. As noted above, the paint finish of the bodywork panel is feathered inwardly around the margin of the inset panel, further concealing the edges of the aperture, the inset panel and the display screen, and further enhancing the illusion that the inset panel and display screen are a continuous part of the bodywork element.

The scale of the right to display an advertisement on a display screen on a car could be structured in several different ways. Advertising space could for example be sold for fixed 10 minute or 20 minute slots during the standard 2 hour maximum duration of a Grand Prix race. The start and the finish of the race are most likely to draw attention, especially for TV viewers, and so slots at these times might have a higher cost, or might be of shorter duration for the same cost. A further approach would be to sell a particular display location for the entire race, but only as a default, with another advertiser being able to substitute its own advertisement for a selected period if it paid a higher rate. In versions of the technology where the advertisement to be shown is controllable from a remote server, a live auction of time slots and locations on the car could be carried out during the race. A variation of this would have the current highest bidder's advertisement shown, until such a point that its bid was beaten.

There would be other desirable stages of the race for showing advertisements. Currently, Formula 1 rules require cars to make at least one pit stop during the race, during which the car will be stationary for several seconds, and TV camera angles are already set-up. Thus, some advertising spaces can be guaranteed good visibility during a pit stop. Either an operation monitoring the race could use the remote server system to switch to the advertisement that had been booked for pit stops at the appropriate time, or an external trigger could be used. (For pit stops, there are electronic arrangements at the entry and exit of the pit lane, used to regulate speeds in the pit lane for safety's sake—this could be used to trigger an-on-board display controller to switch to a particular advertisement from entry into the pit lane until the car re-enters the track). Periods when the race cars are not at maximum speed, such as when a safety car is out or when the race cars are operating under the "virtual safety car" system, could also be sold at premium rates, because of the greater visibility of the advertisements on a slow-moving vehicle. Again, this could be controlled by an operator via the remote server, or the signals used to indicate e.g. virtual safety car conditions could be used to trigger on-board display controllers to show different advertisements.

If desired, mathematical algorithms could be programmed into the remote server and/or the on-board display controller (s) to produce changes of advertisement according to a more complex set of rules, or perhaps combining several of the above control criteria.

The advertisements themselves will need to be approved as suitable before they can be loaded into the remote server or the on-board display controllers. Initially, this would be carried out by human staff, although in time, computer programs or artificial intelligence systems could automate this step.

As mentioned above, the display screens could also be used to display vehicle data to spectators, although not on the level of detail provided to a race-car's pit crew by existing telemetry systems. Since this would prevent the same screen being used for advertising, however, this approach would probably be limited in use—maybe to brief intervals between advertisements, or only when there is unusual data to be "reported".

While the invention has been described above in terms of motor car racing, it is equally applicable to motor cycle racing, particularly track racing, such as MotoGP or Superbike racing (Note: MotoGP is a registered trade mark of Dorna Sports SL). Racing motorcycles have a streamlined cowling around the handlebars, and fairings at the front of the body; above the front wheel and in front of the front forks; in front of the rider's legs; around the fuel tank; and a small fairing at the tail. These are all typically made from sheet carbon fibre composites, similar to those used for motor racing cars.

The display of advertising and sponsorship are just as important to motorcycle racing as they are to motor car racing. As a result, the display panel arrangements described above for installation into the bodywork of racing cars could be incorporated into the cowlings and other bodywork of racing motorcycles, with the same features and benefits.

Figure 11:
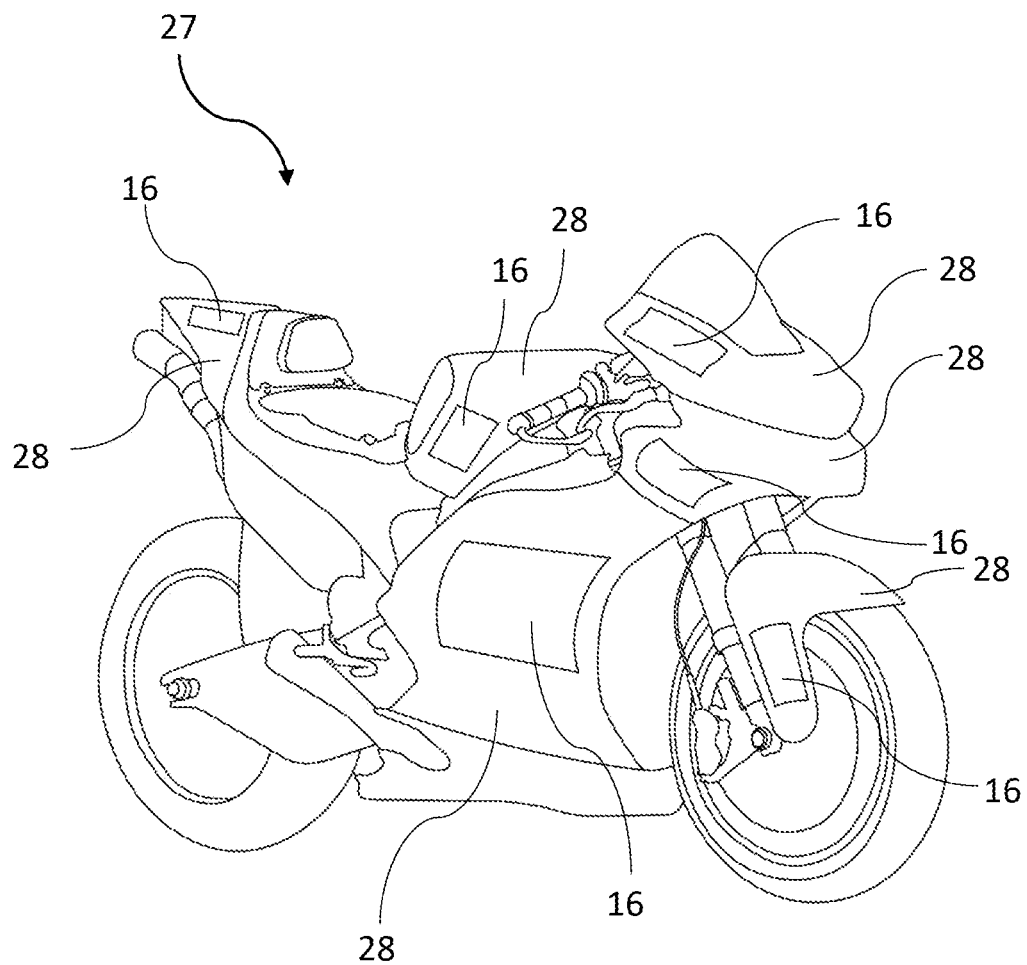
FIG. 11 is a perspective view of a racing motorcycle fitted with display screens embodying the present invention.

FIG. 11 shows a typical track racing motorcycle 27. In this example, each of the larger, more visible cowlings, fairings or other bodywork panels 28 has been fitted with an optically clear panel 16, shaped to follow the profile of that particular bodywork panel 28. Behind each optically clear panel 16 is mounted a display screen arrangement such as one of those shown in FIG. 7, 8, 9 or 10 above, for use on racing cars. Exactly the same control arrangements can be used as described above for motor racing cars, displaying controllably changeable graphics behind each of the clear panels 16, as desired.

There is however, a small drawback, in that the overall surface area of a motorcycle available for display of advertising and sponsorship material in this way is quite small, relative to a racing car. Formula 1 bodywork almost totally encloses the car's driver, and a NASCAR driver is entirely within the car's body, while a motorcycle rider has much of his or her body fully or partially outside the bodywork of the motorcycle, effectively forming part of the aerodynamic surface of the motorcycle when crouched down at speed. Thus, the available space on motorcycles for the display panels as described for racing cars is not high.

Currently, this lack of space on the motorcycle itself is made up for by applying a great deal of sponsorship and advertising material to the rider him- or herself. Racing motorcyclists wear suits of protective clothing, which customarily bear copious amounts of this material on any surface that will be visible to the spectator, either in the normal crouching racing stance or when sitting up on the motorcycle—the classic winner's pose, for example, being a perfect photographic shot to display logos emblazoned across the rider's chest that would be hidden during the race.

This protective clothing is referred to as "leathers", and much of it is indeed still made from leather. It currently consists of boots, gloves and a one-piece full body suit, an example of which is shown in FIGS. 12A and 12B.

The leathers 30 are mainly made up of shaped panels 31 of leather, stitched together. The leathers 30 must allow the rider freely to change position and balance on the motorcycle, while providing protection if the rider comes off the motorcycle, potentially sliding and scraping at great speed across the track surface, or tumbling and rolling across the track and surrounds, depending on the exact circumstances of their departure from the motorcycle. Leathers 30 are hence constructed as a compromise between protective strength, toughness and stiffness on one hand, and comfort and flexibility on the other. At the professional level, leathers 30 are individually fitted to the rider, both for comfort and for aerodynamics.

Current advertising material is incorporated into the leathers permanently, a change of advertiser requiring the complete replacement of the leathers by a set with the new advertiser's graphics applied. This is time consuming and inconvenient. Advertising material still cannot be changed during a race, as there is nothing like enough time at any stage for the rider to change into a fresh set of leathers.

As shown in FIGS. 12A and 12B, most of the leathers 30 are made up of shaped leather panels 31 which are stiff enough to provide a modicum of ground impact protection and tough enough to protect against track surface abrasion (also known as "road rash"). There are also rigid reinforcing bodies 35, 36, 38 at strategic points on the leathers 30, such as at the point of each shoulder 35, at each elbow 36, and a large solid boss below and to the outside of each knee 38.

Racing leathers 30 have one further feature, a rigid aerodynamic hump 39, located on the rider's back, below the neck and extending from the shoulder blades, down the back, partway to the waist. When the rider is in the racing position, crouched over the motorcycle with his or her body almost horizontal and head held right back to see forwards, the hump 39 meets the back of the rider's helmet, forming an almost continuous aerodynamic fairing behind the helmet and avoiding the turbulence that would otherwise form behind a rounded helmet.

Figure 13:
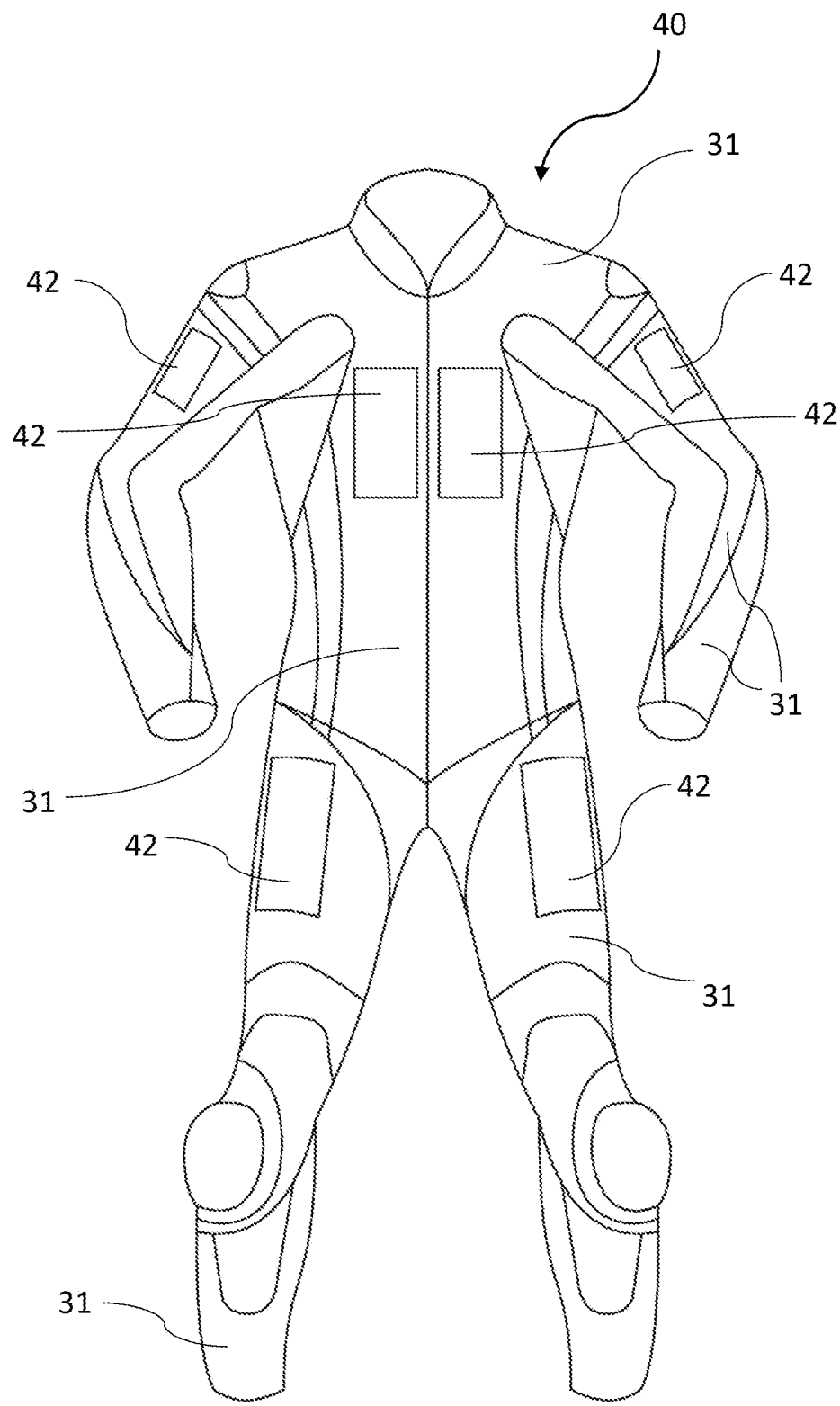
FIG. 13 is a frontal elevation of a set of motorcycle racing leathers showing possible locations of display screens embodying the present invention.
Figure 14:
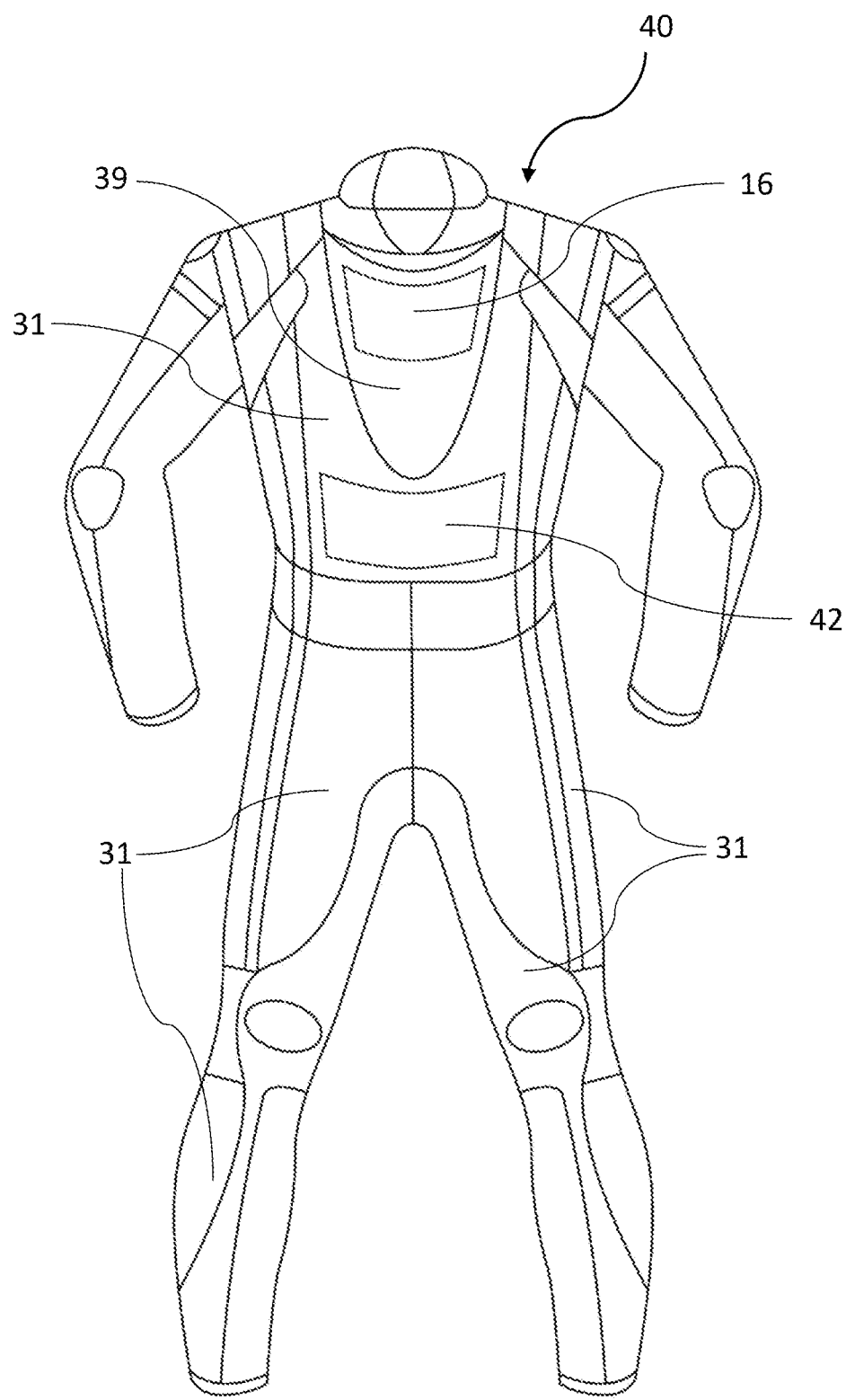
FIG. 14 is a rear elevation of the set of motorcycle racing leathers of FIG. 13, showing further possible locations of display screens embodying the present invention.

This construction allows the incorporation of a display panel system, similar to that described above for racing car and motorcycle bodywork, into a modified set of motorcycle racing leathers 40, shown in FIGS. 13 and 14.

In place of the rigid optically clear panels 16 used in the bodywork embodiments of the present invention, the flexible display screen 17 can be mounted to one side of a sheet of optically-clear flexible plastics 42, using an optically-clear adhesive 18, as in the system of FIG. 7; "vinyl", i.e. plasticised poly(vinyl chloride) sheet, is a suitable option. Instead of forming an aperture 14 as in the bodywork embodiments, the vinyl sheet 42 can be dimensioned to form a margin extending beyond the flexible display screen 17 to each side. This combination can be sewn to an outer surface of the leathers 30 by means of this margin.

It would also be possible to cut an aperture 14 into leather panels 31 of leathers 30, and to insert the optically-clear flexible plastics sheet 42 from within to form a window, with the flexible display screen 17 being mounted to the inside of this window with the optically-clear adhesive 18.

In general, either or both of these options would preferably be used on the portions of the leathers 30 made from stiff leather panels 31, but where some degree of flexibility is expected.

However, on the aerodynamic hump 39, one could use a variant of the display panels shown above incorporated into vehicle bodywork, since the aerodynamic hump 39 is large, substantially rigid and prominent in use during racing. Here, it would be straightforward to incorporate a suitably-profiled optically clear panel 16 into the rigid aerodynamic hump, with the flexible display panel 17 being mounted to its inner face, much as for any of the bodywork-mounted variants described above (see FIGS. 7 to 10).

The interior of the aerodynamic hump 39 is available to hold the display controller 25 and any other electronics and communication equipment that may be required. Indeed, the aerodynamic hump 39 may conveniently be used to hold the display controller 25, etc, for any of the display screen arrangements incorporated into the modified leathers 40, described above.

Thus, suitable display panels can be incorporated in various places on the modified leathers 40, the type of panel depending on the local flexibility needed, and these display panels can be used to display any of the logos, brands, sponsor identification or more factual data that has been described above as being displayed on racing car or motorcycle bodywork.

FIGS. 15 and 16 each show a further arrangement for incorporating flexible reflective display screens 17 into modified racing leathers 40. In the arrangement of FIG. 15, a shallow pocket 43 is formed on an outer surface of a leather panel 31, comprising an optically clear flexible plastics sheet 42, profiled at its edges so as to be faired into a profile of the leather panel 31. An opening (not shown) is provided adjacent one edge of the pocket 43 to provide access to its interior. A flexible reflective display screen 17 can thus readily be inserted into the pocket 43 and plugged into electrical connections within the pocket 43 (not shown for simplicity).

In the arrangement of FIG. 16, a pocket 45 is formed on an outer surface of a leather panel 31 of the racing leathers 40, in which the pocket 45 is made up of a further sheet of leather 44 sewn to the leather panel 31. The leather sheet 44 has a proportionately large central window aperture, which is filled by a panel of optically clear plastics material (here, an optically clear flexible plastics sheet 42), fixed to an inner face of the leather sheet 44. The leather sheet 44 is thinned adjacent its margins, so as to be faired into a profile of the leather panel 31. An opening (not shown) is provided adjacent one edge of the pocket 43 to provide access to its interior. Within this interior of the pocket 45, an internal pouch 46 of leather or flexible plastics material is located adjacent to and generally co-extensive with the optically clear flexible plastics sheet 43, so that it may receive a flexible reflective display screen 17 and hold it in alignment with the optically clear flexible plastics sheet 42 for maximum visibility. (Electrical connections, not shown for simplicity, are provided within the internal pouch 46, to link the display screen 17 to a remote display controller 25, a power supply, etc)

Thus, in both arrangements, a display screen 17 can rapidly be replaced if necessary, or it can be inserted at the last minute to reduce the risk of damage. They also allow removal of the display screens 17 for cleaning of the leathers 40. It is currently envisaged that these arrangements allowing selective insertion and removal of display screens 17 from the leathers 40 would be particularly suitable for use mounted to the more flexible leather panels 31 of the suit as a whole.

The invention claimed is:

1. A bodywork element for a vehicle, adapted for the external display of controllably selectable images, comprising a bodywork panel having an aperture formed therein, a inset panel of optically clear plastics material filling said aperture, with an outer surface of the inset panel extending flush with an outer surface of the bodywork panel and being formed to continue a surface profile of the bodywork panel, and flexible display screen means mounted to an inner face of the inset panel so as to be visible through the inset panel, the display screen means being operatively connected or connectable to control means for the display screen means, said control means being adapted to control the display screen means to display a selected image;

wherein the display screen means comprises a reflective display screen means.

2. A bodywork element for a vehicle as claimed in either claim 1, wherein a volume defined between an inner surface of the inset panel and an adjacent display surface of the display screen means is filled with an optically clear solid, liquid or gel material.

3. A bodywork element for a vehicle as claimed in claim 2, wherein the display screen means is mounted to the inner surface of the inset panel by means of a continuous, void-filling layer of optically clear adhesive.

4. A bodywork element for a vehicle as claimed in claim 1, wherein a filler material is inserted along a join between an inner circumference of the aperture in the bodywork panel and an outer circumference of the inset panel, so as to fill any gaps between the bodywork panel and the inset panel, and is optionally shaped to blend together a surface profile of the bodywork panel and a surface profile of the inset panel.

5. A bodywork element for a vehicle as claimed in claim 4, wherein the bodywork panel is coated with a conventional paint finish, which is feathered over a marginal zone of the inset panel, camouflaging the join and an outer rim of the display screen means beneath the inset panel.

6. A bodywork element for a vehicle as claimed in claim 4, wherein the bodywork panel is coated with a conventional paint finish extending across a marginal zone of the inset panel to camouflage the join, wherein a shape of the inset panel and a shape of an inner edge of the conventional paint finish are substantially different, thus obscuring the shape of the inset panel and a shape of the display screen means beneath the inset panel.

7. A bodywork element for a vehicle as claimed in claim 1, wherein the aperture in the bodywork panel is formed with a rebate on an outer or an inner surface of the panel, extending around the circumference of the aperture.

8. A bodywork element for a vehicle as claimed in claim 7, wherein the inset panel is profiled around its circumference to conform to said rebate, optionally so as to form an interference fit therewith.

9. A bodywork panel for a vehicle as claimed in claim 1, where the control means comprises part of the bodywork element and is mounted thereto.

10. A bodywork panel for a vehicle as claimed in claim 1, wherein the control means is mounted to the vehicle away from the bodywork element, with a detachably wired or wireless operative connection between the control means and the display screen means.

11. A bodywork panel for a vehicle as claimed in claim 1, wherein the control means is wirelessly operatively connectable to remote server means, by which image data and/or display instructions are transmittable to the control means.

12. A bodywork element for a vehicle as claimed in claim 1, wherein the bodywork element has a plurality of apertures formed therein, each aperture being filled by a corresponding inset panel and having a respective display screen means mounted to the inner face of each inset panel.

13. A bodywork element for a vehicle as claimed in claim 12, wherein the plurality of display screen means are each operatively connected or connectable to a respective control means.

14. A bodywork element for a vehicle as claimed in claim 1, wherein the vehicle comprises a racing motor car or a racing motorcycle.

15. A method for producing a bodywork element for a vehicle, adapted for the external display of controllably changeable images, comprising the steps of:
providing a bodywork panel having an aperture formed therein,
providing an inset panel of optically clear plastics material shaped to fit said aperture and formed to match a surface profile of the bodywork panel;
fitting said inset panel into said aperture;
providing reflective flexible display screen means;
mounting the flexible display screen means to an inner face of the inset panel so as to be visible through the inset panel; and
arranging an operative connection between the flexible display screen means and control means for the display screen means, said control means being adapted to control the display screen means to display a selected image.

16. A method for producing a bodywork element for a vehicle as claimed in claim 15, wherein the control means is mounted to the bodywork element.

17. A method for producing a bodywork element for a vehicle as claimed in either claim 15, wherein the control means is adapted to receive image data and instructions from a remote server means, optionally by radio.

18. A method for producing a bodywork element for a vehicle as claimed in claim 15, wherein the method comprises the step of filling any volume extending between the inner surface of the inset panel and a display surface of the display screen means with an optically-clear solid, liquid or gel material.

19. A method for producing a bodywork element for a vehicle as claimed in claim 15, wherein said bodywork element comprises a bodywork element for a vehicle, adapted for the external display of controllably selectable images, comprising a bodywork panel having an aperture formed therein, a inset panel of optically clear plastics material filling said aperture, with an outer surface of the inset panel extending flush with an outer surface of the bodywork panel and being formed to continue a surface profile of the bodywork panel, and flexible display screen means mounted to an inner face of the inset panel so as to be visible through the inset panel, the display screen means being operatively connected or connectable to control means for the display screen means, said control means being adapted to control the display screen means to display a selected image;
wherein the display screen means comprises a reflective display screen means.

* * * * *